(12) United States Patent
Washington

(10) Patent No.: US 8,459,999 B2
(45) Date of Patent: Jun. 11, 2013

(54) PHONICS EDUCATION APPARATUS AND METHOD

(76) Inventor: Mary Jean Washington, Cohoes, NY (US)

( * ) Notice: Subject to any disclaimer, the term of this patent is extended or adjusted under 35 U.S.C. 154(b) by 290 days.

(21) Appl. No.: 13/042,605

(22) Filed: Mar. 8, 2011

(65) Prior Publication Data

US 2012/0231426 A1    Sep. 13, 2012

(51) Int. Cl.
*G09B 1/00* (2006.01)

(52) U.S. Cl.
USPC .......................................... 434/174; 434/172

(58) Field of Classification Search
USPC ................. 434/155, 167, 170–176, 178, 404, 434/405
See application file for complete search history.

(56) References Cited

U.S. PATENT DOCUMENTS

| 259,920 A | 6/1882 | Reiff | |
|---|---|---|---|
| 270,511 A | 1/1883 | Thomson | |
| 886,172 A | 4/1908 | Bevans | |
| 1,538,530 A * | 5/1925 | Troidl | 434/176 |
| 1,558,229 A * | 10/1925 | Bowman | 273/296 |
| 1,617,024 A | 2/1927 | Munsell et al. | |
| 1,656,030 A | 1/1928 | Waring | |
| 1,671,758 A | 5/1928 | Appley | |
| D80,714 S | 3/1930 | Crumley | |
| D96,199 S | 7/1935 | Ellis | |
| 2,066,871 A * | 1/1937 | Wolfe | 434/172 |
| 2,091,555 A * | 8/1937 | Messinger | 434/172 |
| 2,411,717 A | 11/1946 | Fay et al. | |
| 2,858,624 A | 11/1958 | Bowman | |
| 2,878,590 A | 3/1959 | Dodge | |
| 2,932,909 A | 4/1960 | Bosco | |
| 2,938,282 A * | 5/1960 | Spielman | 434/172 |
| 3,200,517 A * | 8/1965 | D'Agostino | 434/174 |
| 3,453,750 A * | 7/1969 | Rapaport | 434/168 |
| 3,460,273 A | 8/1969 | Boyd | |
| 3,472,117 A | 10/1969 | Iverson et al. | |
| 3,721,020 A * | 3/1973 | Martin | 434/170 |
| 3,798,797 A * | 3/1974 | Mandel | 434/171 |
| D238,423 S | 1/1976 | Nickles | |
| 3,960,046 A | 6/1976 | Choong | |
| 4,096,644 A | 6/1978 | Nesher et al. | |
| 4,109,399 A | 8/1978 | Ivancevich | |
| 4,204,343 A * | 5/1980 | Brooks | 434/172 |
| 4,389,193 A * | 6/1983 | Phillips | 434/174 |
| 4,643,680 A * | 2/1987 | Hill | 434/170 |
| 4,711,632 A | 12/1987 | Detrick | |
| D295,191 S | 4/1988 | Goldman | |
| 5,167,505 A | 12/1992 | Walsh | |
| 5,447,439 A | 9/1995 | Nathanson | |

(Continued)

*Primary Examiner* — Kurt Fernstrom
(74) *Attorney, Agent, or Firm* — Lawrence P. Trapani, Esq.

(57) ABSTRACT

A phonics education apparatus, comprising a first word-constructing member (12) and a second word-constructing member (14). The first member has a first plurality of word fragments (20), each of which is plainly identified by indicia (16). The second member has a second plurality of word fragments (22), each of which is also plainly identified by indicia (18). The indicia of each of the second plurality of fragments is different from each other and matches the indicia of at least one of the first plurality of fragments. The matching indicia signify that a word is to be formed from the word fragments identified by the matching indicia. Either or both of the members are movable, enabling any word fragment of the first plurality of fragments to be paired with any word fragment of the second plurality of fragments. Accordingly, the formation of words is guided by the indicia of the word fragments. The indicia are preferably colors.

29 Claims, 6 Drawing Sheets

U.S. PATENT DOCUMENTS

| | | |
|---|---|---|
| 5,709,552 A | 1/1998 | LeGrange |
| 5,727,949 A | 3/1998 | Bar-Or et al. |
| 6,358,059 B1 | 3/2002 | Li |
| 6,648,647 B2 | 11/2003 | Wood et al. |
| 6,869,286 B2 | 3/2005 | Furry |
| 7,354,070 B2 | 4/2008 | Polick |
| 8,016,596 B2 * | 9/2011 | Blank .......................... 434/156 |
| 2002/0132218 A1 | 9/2002 | White |

* cited by examiner

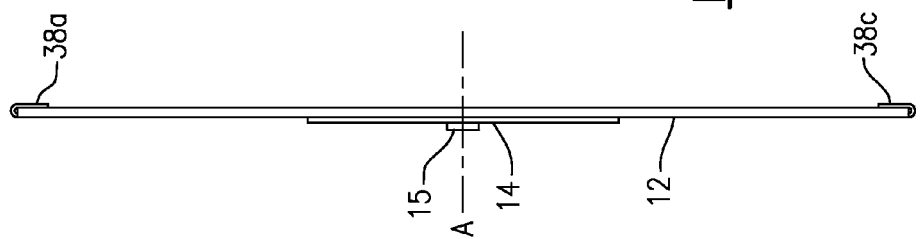
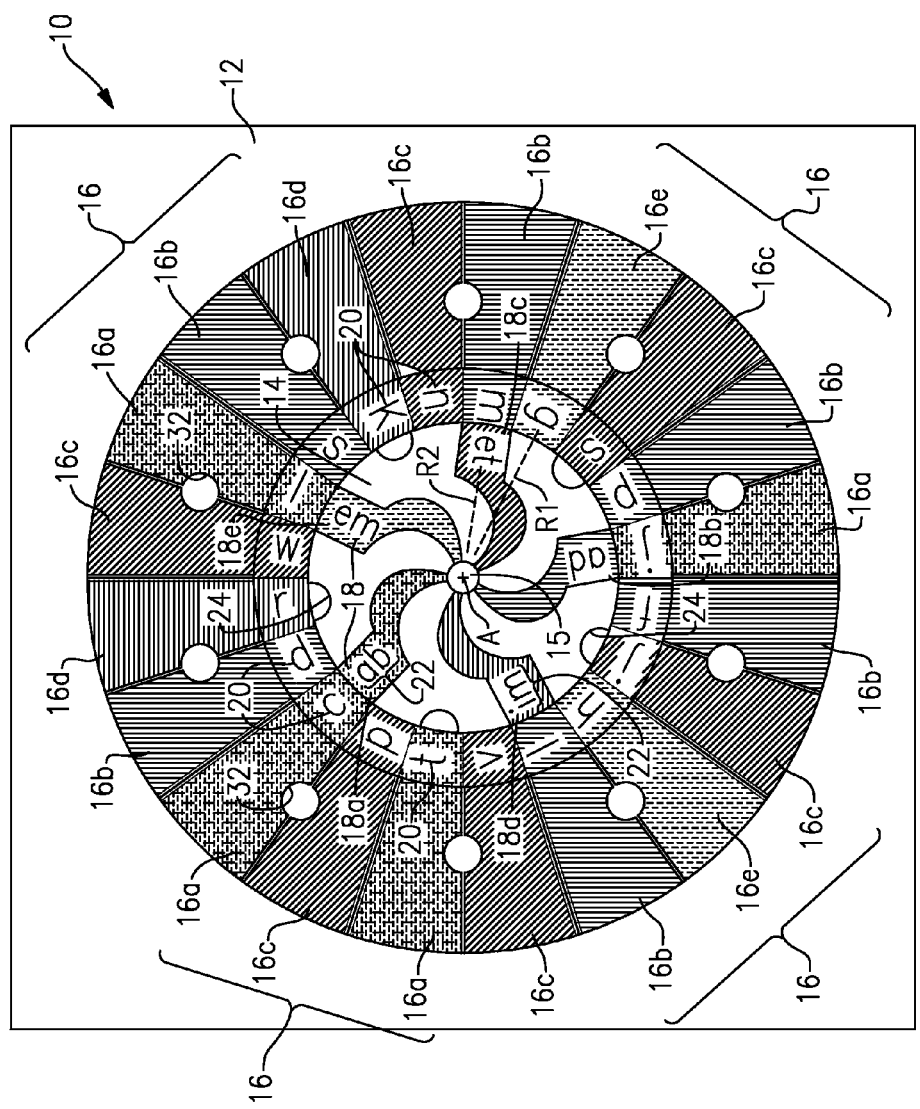

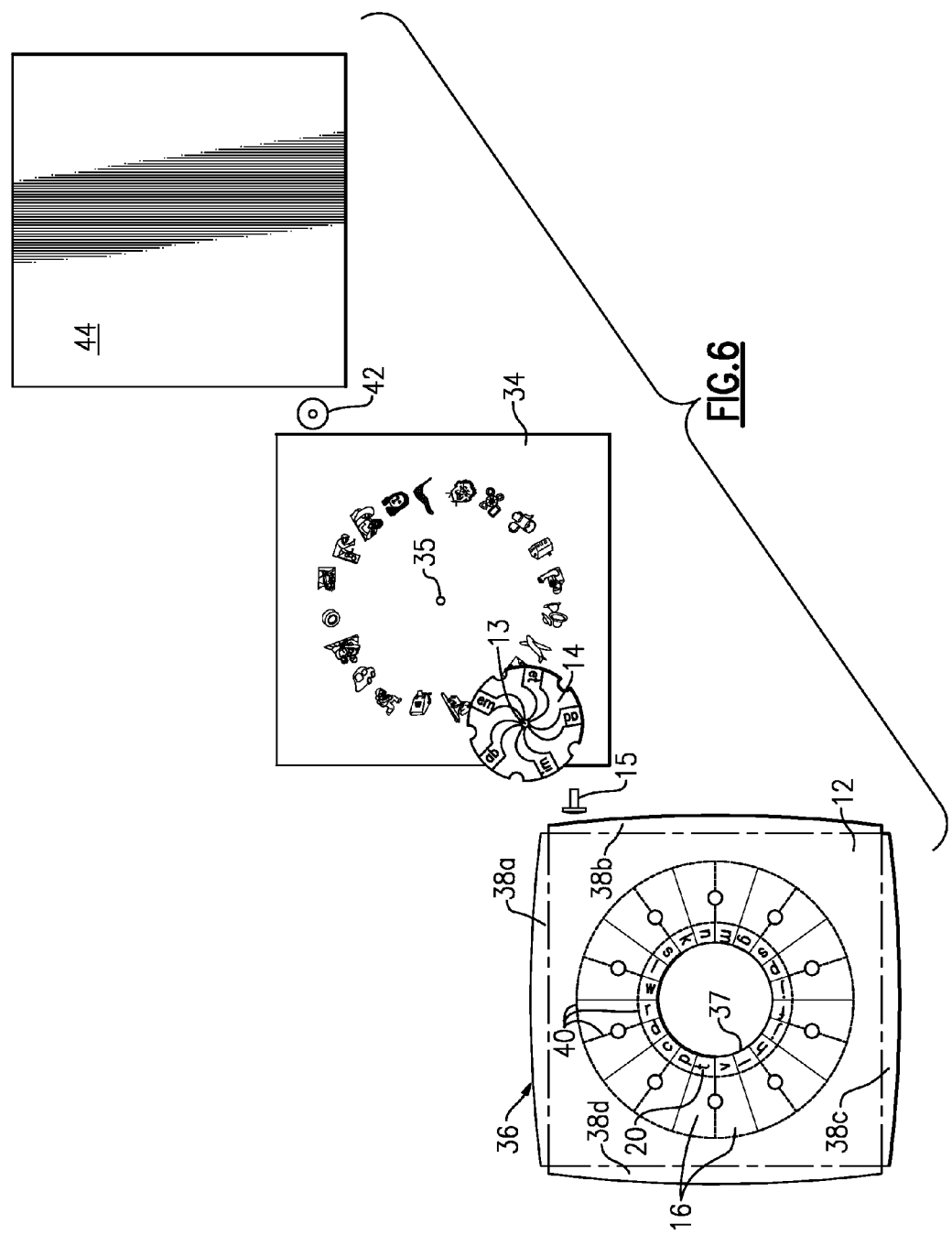

Cross over to ab STREET 70

From my window, I could see a yellow cab.

From my window, I could see a yellow cab and a man with the gift of *gab* ran into a left jab.

From my window, I could see a yellow cab and a man with the gift of *gab* ran into a left jab when he came out of the lollypop lab.

From my window, I could see a yellow cab and a man with the gift of *gab* ran into a left jab when he came out of the lollypop lab all because he tried to *nab* a *dab* of candy without paying his tab Sunday.

FIG.9

PHONICS EDUCATION APPARATUS AND METHOD

BACKGROUND OF THE INVENTION

1. Field of Invention

The present invention relates generally to apparatus and methods in the field of education, and more particularly to apparatus and methods for reading and phonics education.

2. Background Art

There have been numerous systems, devices and methods used in reading and phonics education over the years. Generally, such have included the use of flash cards, workbooks, coloring books, tile pieces, tables, charts, and rotary charts, discs, drums, wheels, or dials. The focus will be on the latter group of devices, which have existed in the art for over a hundred years. For example, the following U.S. patents disclose such rotary devices for educational purposes: U.S. Pat. No. 7,354,070 to Polick (2008); U.S. Pat. No. 6,869,286 to Furry (2005); U.S. Pat. No. 6,358,059 to Li (2002); U.S. Pat. No. 4,643,680 to Hill (1987); U.S. Pat. No. 4,389,193 to Phillips (1983); U.S. Pat. No. 3,460,273 to Boyd (1967); U.S. Pat. No. 2,411,717 to Fay et al. (1946); U.S. Pat. No. 1,671,758 to Appley (1928); U.S. Pat. No. 886,172 to Bevans (1908); U.S. Pat. No. 270,511 to Thomson (1883); and U.S. Pat. No. 259,920 to Reiff (1882). Most of these patents disclose the concept of constructing words using one wheel or section rotated relative to another wheel or section.

The above-identified patent to Li discloses a method and tools for rapid and accurate decoding and encoding of words. Sound units (a combination of blendable letter sounds) are used to accurately decode (read) words. A combination of wheels is utilized to encode (write or make) thousands of words and word-like combinations to learn words and their structures. The above-identified patent to Appley relates to a phonics game to teach the formation of letters into simple words and the effect of final "e" upon a group of letters. The above-identified patent to Boyd discloses a disc containing vowel word fragments (e.g., AT, AR, OT, etc.; FIG. 3) and consonant tab pieces (FIG. 4). The consonant tab pieces (B, C, H, M, P, R, S, V) are clipped onto a rotatable wheel (FIG. 1) and positioned with the vowel fragment to create a family of words (e.g., BAT, CAT, . . . , RAT, etc.).

In addition to constructing words, the above-identified patents to Furry, Phillips, Fay et al., Bevans, and Thomson also present images representing the constructed words. For example, Phillips uses rotating wheels to construct the word B-OAT and shows an image of a boat (see FIGS. 2 & 3). The image and consonant are shown first and then the word is constructed based on the image; the image actually guides the student in constructing the word. The image becomes hidden when the word is constructed (FIG. 3). In Bevans, rotating sections are used to construct the word C-O-W (FIG. 1) and then the word is confirmed by turning the sections over to see a properly constructed image of a cow (FIG. 2). In Thomson, rotating and stationary wheels are used (FIG. 1) for constructing the words D-U-CK, D-O-CK, D-E-CK, etc. There are images of a duck, dock and deck, which guide the student in constructing the words.

There are education tools that employ hidden images or other information, which are ultimately revealed to confirm a correct answer. The above-identified patent to Polick discloses a flap being opened to reveal an image or the correct answer to a multiplication problem set up by a rotating wheel (FIGS. 3 & 4). U.S. Pat. No. 6,648,647 (2003) to Wood et al. discloses a rotating wheel containing both letters and related images (FIG. 3(a)). The wheel is turned to select a letter, such as "A" (see FIG. 1), and three images are presented in windows. The images may be hidden by sliding doors. The student selects the image corresponding to the letter (e.g., an apple) by sliding open the door. U.S. Pat. No. 5,447,439 (1995) to Nathanson discloses a booklet containing sentences that need to be completed (FIG. 1), such as "A is for _____". The intended answer is "apple," and after attempting an answer, the student scratches off the blank area to reveal an apple. U.S. Pat. No. 1,656,030 (1924) to Waring discloses sheets that show different colors or animals to be named and separate name cards to be matched with the colors or animals (FIGS. 5-8). After the matching is done, a flap is opened to reveal the correct match.

There are education tools that employ the concept of matching colors between two items to guide a learning activity. U.S. Pat. No. 5,167,505 (1992) to Walsh discloses different colored groups of clothespins (FIG. 1) being clipped to the rim of a bucket (FIG. 3). Along the rim are defined areas, each of a different color that corresponds to a colored group of clothes-pins. The student clips the clothespin to the proper rim area by matching the color (FIG. 3), which purportedly teaches sequencing and ordering by color. U.S. Pat. No. 4,096,644 (1978) to Nesher et al. discloses a stationary wheel on a board having colored sections. Colored, transparent rotating strips are superimposed on each other to produce a composite color that matches the color of a colored section on the stationary wheel. Color matching guides the student in finding the correct factors of a target number. For example, the target number 28 has factors 2×2×7=28. Thus, two strips having a value of 2 and a strip having a value of 7 will produce the correct composite color.

There are also education apparatus that employ rotating wheels or sections containing unhidden images along with words or letters, for word recognition and pronunciation. U.S. Pat. No. 2,932,909 (1960) to Bosco discloses the concept of matching the first letter or letters of a word with the word itself. For example, a letter "H" is used to guide the student to match the H with the word "House" (FIG. 1). An unhidden image of a house is displayed along side of the word House (FIG. 4). U.S. Pat. Appl. No. 2002/0132218 to White (2002) discloses stacked sections pivotally connected together for pivotal movement about a center axis and carrying a portion of an image, such as a shape, object or color on one side, and educational indicia on the other side illustrating the image. As shown in FIG. 4, an unhidden image of an alligator is displayed along side the word "alligator," and the section containing only a textual reference to "apple" has a corresponding image on the reverse side of the deployed sections (FIG. 5).

While some of the above-mentioned educational tools and devices have merit and have had some success, some are unduly complicated and boring. Some attempt to provide too much information at one time to children, who typically do not have the attention span to absorb a large amount of information at one time. Others seek to focus on words without visual aid and fail to recognize that visual aid and color have a positive bearing on learning. Accordingly, there still remains a need in the education industry to provide a phonics education tool that is easy to operate, does not require constant supervision from a teacher, is self-guiding and self-verifying, and is inviting and fun for young students. A phonics education tool is needed that encourages a spontaneous and enthusiastic response, just like playing.

OBJECTS AND SUMMARY OF THE INVENTION

It is therefore an object of the present invention to provide phonics education apparatus and methods that overcome the drawbacks of the prior art and fulfill the aforementioned needs.

It is another object of the present invention to provide phonics education apparatus that are easy for a child to operate.

It is a further object of the present invention to provide phonics education apparatus that require a minimum amount of supervision during use.

It is yet another object of the present invention to provide phonics education apparatus that self-guide the student in the operation of the apparatus and provide verification or confirmation of the student's work.

It is yet a further object of the present invention to provide phonics education apparatus that are inviting and fun for young students and encourage spontaneous and enthusiastic use of the apparatus.

It is still another object of the present invention to provide phonics education apparatus that have a sturdy yet simple and low cost construction.

These and other objects are attained in accordance with the present invention, wherein there are provided phonics education apparatus and methods. In one exemplary embodiment, such apparatus comprises first and second word-constructing members. The first word-constructing member has a first plurality of word fragments displayed thereon, where each of the first plurality of word fragments is plainly identified by indicia. The second word-constructing member is positioned adjacent said first word-constructing member and has a second plurality of word fragments displayed thereon. Each of the second plurality of word fragments is also plainly identified by indicia. The indicia of each of the second plurality of word fragments is different from each other and substantially matches the indicia of at least one of the first plurality of word fragments. The substantially matching indicia signify that a word construct (hereinafter defined) is to be formed from the word fragments identified by the substantially matching indicia. Either or both of the first and the second members are movable, one relative to the other, enabling any word fragment of the first plurality of fragments to be paired together with any word fragment of the second plurality of fragments. Accordingly, the formation of word constructs by the pairing of word fragments from the first and the second pluralities of fragments is guided by the indicia identifying the word fragments. The term, "word construct," is used herein to mean and encompass a complete word or a part of a complete word, constructed from at least two word fragments.

In another embodiment, the phonics education apparatus further comprises a plurality of images associated with the first plurality of word fragments, respectively. Each image symbolizes a word to be formed using the word fragment associated with the image. In a variation of this embodiment, the plurality of images may be normally hidden from view. At the option of the user, an image may be selectively revealed when a word is formed. Therefore, some means may be provided for selectively revealing each of the images (e.g., a flap that can be opened manually or a software routine executed by touch screen). Thus, when a word is formed by pairing together word fragments, the image symbolizing the formed word can be revealed and viewed in connection with the formed word. This feature provides confirmation to the user about the correctness of the word and its meaning.

In a further embodiment, the first plurality of word fragments includes a plurality of consonant-based word fragments (e.g., consonants, consonant blends, consonant digraphs, etc.) and the second plurality of word fragments includes at least one vowel-based word fragment (e.g., vowels, vowel-consonant blends, vowel digraphs, R-controlled vowels, vowel diphthongs, etc.). The indicia of the vowel-based fragment (e.g., "AT") substantially matches the indicia of each of the plurality of consonant-based fragments (e.g., B, C, F, H), to guide the formation of a family of words (e.g., BAT, CAT, FAT, HAT). For the purpose of this specification, a consonant-based word fragment consists of one or more consonants, while a vowel-based word fragment contains at least one vowel, but may be grouped with one or more consonants. For example, a vowel blend or vowel-consonant blend is a vowel-based word fragment.

It is preferred that the indicia identifying each of the first and the second pluralities of word fragments be a color indicia. For example, the indicia may take the form of a colored background on which the word fragment is applied. In another example, the indicia may be the color of the font of the characters used to represent the word fragment. In a further example, the indicia may be a pattern of colors (e.g., a checkered pattern).

It is also preferred that the first and second word-constructing members be in the form of first and second sheets of material, respectively. The sheets are preferably made of a stiff material, such as for example, paperboard or plastic. The sheets have a front surface on which the word fragments are displayed. The first plurality of word fragments is disposed circumferentially on the front surface of the first sheet, about a central axis and at a first radius. The second sheet is preferably positioned in concentric relationship to the first sheet. The second plurality of word fragments is disposed circumferentially on the front surface of the second sheet, about the central axis and at a second radius. The second radius is smaller than the first radius, such that the second plurality of word fragments is inside and adjacent the first plurality of word fragments. The second sheet is pivotally mounted at the central axis for rotational movement relative to the first sheet, such that one of the second plurality of word fragments can be selectively paired with one of the first plurality of word fragments to form a word. Preferably, the second sheet is shaped in the form of a wheel, dial or disc.

A phonics education method is also contemplated within the scope of the present invention. In accordance with one embodiment of the present invention, the method comprises the steps of: (a) displaying a first plurality of word fragments and plainly identifying each of the first plurality of fragments by an indicia; (b) displaying a second plurality of word fragments adjacent the first plurality of fragments and plainly identifying each of the second plurality of fragments by an indicia; (c) signifying that a first word construct is to be formed from a first word fragment of the first plurality of fragments and from a first word fragment of the second plurality of fragments, by making the indicia of the first word fragments substantially match; (d) moving either or both of the first and the second pluralities of word fragments, one relative to the other; and (e) forming the first word construct by pairing the first word fragment of the first plurality of fragments with the first word fragment of the second plurality of fragments. The substantially matching indicia of the first word fragments guide the formation of the first word construct.

The method may further comprise the steps of: (f) signifying that a second word construct is to be formed from a second word fragment of the first plurality of fragments and from the first word fragment of the second plurality of fragments, by making the indicia of the second word fragment substantially match the indicia of the first word fragment of the second plurality of fragments; and (g) forming the second word construct by pairing the second word fragment with the first word fragment of the second plurality of fragments. The substantially matching indicia guide the formation of the second word construct.

The method may additionally comprise the steps of: (1) associating a plurality of images with the first plurality of word fragments, respectively, each image symbolizing a word to be formed using the associated word fragment; (2) normally hiding the images from view; (3) revealing one of the images after a word is formed with a word fragment associated with the one image; and (4) viewing the one image in connection with the word formed in step (3).

Without limiting the scope of the present invention, one particular embodiment can be described as having a moving color-coded wheel or dial that rotates clockwise and/or counterclockwise, matching family vowel sounds or vowel word fragments (e.g., AT, AP, UT, etc.) with consonants to form three-letter one-syllable rhyming words (e.g., BAT, CAT, etc.). The consonants are located on a surrounding fixed board, also color-coded. Each vowel sound is coded with a unique color and a group of consonants are coded with the same color. The color signifies to the child that a family of words can be formed by matching the vowel fragment with consonants of the same color. The color-coded wheel makes it easy for children of primary and preschool age to identify, learn and familiarize themselves with different word families and decipher words with r-controlled vowels (ar), vowel digraphs (ay), and vowel diphthongs (ow, ew, oy, aw). This embodiment is simple and colorful, inviting children to rotate the wheel to encode (i.e., make) and decode (i.e., read) words. The child knows he or she has formed a new one-syllable three-letter word when the colors match. The fixed board also contains doorways with color-coded door-flaps. Each doorflap opens to reveal a picture which supports the reading of a new word that has been formed.

It would seem that a most spontaneous and enthusiastic response would be derived from the twisting of a color-coded wheel, matching a color, making a one-syllable word, looking at a picture, and pronouncing the word, as the student learns to read, pronounce and spell while playing. One advantage of having this kind of teaching device is that whenever a colored segment on the moving wheel or dial is matched with a colored segment on the fixed board, a new three-letter one-syllable word is formed. In this particular embodiment, 20 words per board can be formed, and each of a corresponding twenty door-flaps can be opened to reveal a picture reaffirming the right word.

BRIEF DESCRIPTION OF THE DRAWING

Further objects of the present invention will become apparent from the following description of a preferred embodiment, with reference to the accompanying drawing, in which:

FIG. 1 is a top plan view of the preferred embodiment of the phonics education apparatus of the present invention;

FIG. 2 is a side view of the apparatus of FIG. 1;

FIG. 6 is an exploded view of the apparatus of FIG. 1;

FIG. 9 is a view of a page from a reading book, which may be used in conjunction with the apparatus of FIG. 1.

DETAILED DESCRIPTION OF THE PREFERRED EMBODIMENT

Figure 3:
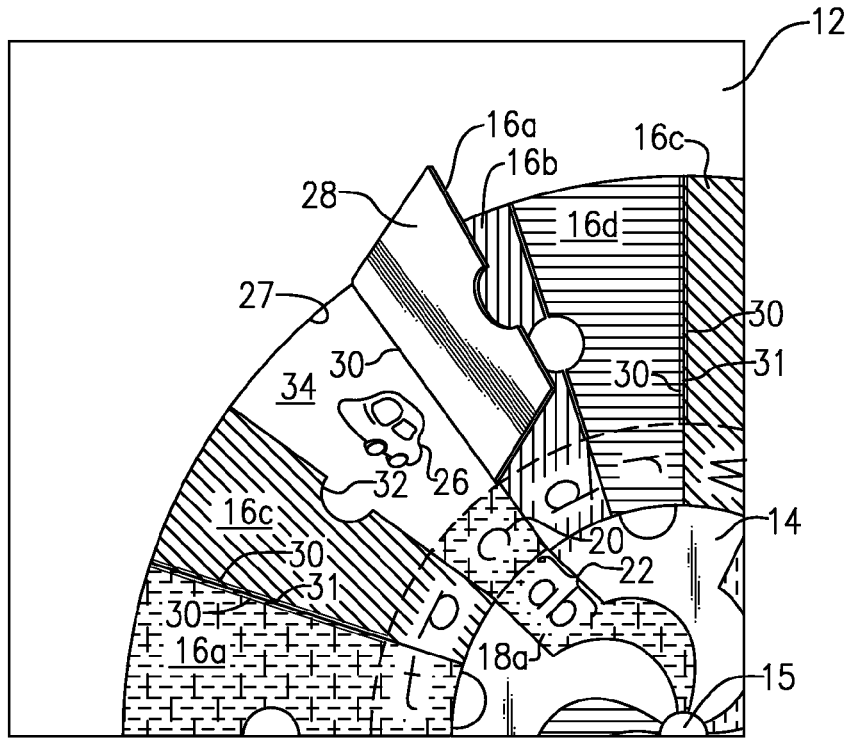
FIG. 3 is an enlarged partial view of the apparatus of FIG. 1, with a focus on the consonant "c" on a yellow background.

Referring to FIGS. 1-2, there is shown a phonics education apparatus 10 constructed in accordance with one embodiment of the present invention. Apparatus 10 comprises a fixed word-constructing member 12 and a rotating word-constructing member 14. Members 12 and 14 are made of sheets of rigid or semi-rigid material, such as for example, paperboard or plastic. Member 14 is pivotally mounted at a central axis A by a rivet or pin 15 (further construction details are given below). Fixed member 12 includes, on a front surface, twenty color-coded segments 16 disposed circumferentially about and radially spaced from center axis A. Five colors are represented among segments 16. In this embodiment, there are four yellow segments 16a, six pink segments 16b, six green segments 16c, two blue segments 16d, and two purple segments 16e. Rotating member 14 includes, on a front surface, five color-coded segments 18 disposed circumferentially about center axis A. The same five colors represented among segments 16 are represented among segments 18. In this embodiment, there is one yellow segment 18a, one pink segment 18b, one green segment 18c, one blue segment 18d, and one purple segment 18e.

Member 12 has twenty consonant-based word fragments 20, which, in this embodiment, are merely consonants. The twenty consonants are situated in the twenty color-coded segments 16, respectively. In the example of FIG. 1, consonants l, j, t, and c are identified by the yellow color in segments 16a; consonants s, m, p, f, l, and d are identified by the pink color in segments 16b; consonants w, n, s, j, v, and p are identified by the green color in segments 16c; consonants K and r are identified by the blue color in segments 16d; and consonants g and h are identified by the purple color in segments 16e. Member 14 has five vowel-based word fragments 22, which, in this embodiment, are vowel-consonant blends ("V-C blends"). The five V-C blends are situated in the five color-coded segments 18, respectively. V-C blend, ab, is identified by the yellow color in segment 18a; V-C blend, ad, is identified by the pink color in segment 18b; V-C blend, et, is identified by the green color in segment 18c; V-C blend, im, is identified by the blue color in segment 18d; and V-C blend, em, is identified by the purple color in segment 18e.

As seen from FIG. 1, rotating member 14 is concentrically located relative to fixed member 12. Consonants 20 are disposed along a circumferential path on member 12 at a radius R1 from center axis A, and V-C blends 22 are disposed circumferentially on member 14 at a radius R2 from center axis A. In this arrangement, V-C blends 22 are adjacent the circumferential path of consonants 20. Member 14 is rotated relative to member 12 so that a V-C blend can be paired together with a consonant to form a word or a word construct. Member 14 contains cut recesses 24 about its periphery, so that member 14 can be manually rotated by placing a finger in one of the recesses and applying a tangential force.

The colors in segments 16 and 18 function as indicia for consonants 20 and V-C blends 22. If the color associated with one of the consonants 20 is the same as or matches the color of one of the V-C blends 22, this match signifies that a word is to be formed from that one consonant and that one V-C blend. Since, in the example of FIG. 1, more than one consonant 20 is associated with a single color, the formation of a family of words is signified between the consonants of the single color and the V-C blend having the same or a matching color. In this example, the intent is for the student to learn about individual words and word families. Consonants l, j, t, and c, identified by yellow (segments 16a), are each to be paired with V-C blend, ab, also identified by yellow, creating the word family: lab, jab, tab, and cab. Consonants s, m, p, f, l, and d, identified by pink (segments 16b), are each to be paired with V-C blend, ad, also identified by pink, creating the word family: sad, mad, pad, fad, lad, and dad. Consonants w, n, s, j, v, and p, identified by green (segments 16c), are each to be paired with V-C blend, et, also identified by green, creating the word family: wet, net, set, jet, vet, and pet. Consonants K and r, identified by blue (segments 16d), are each to be paired with V-C blend, im, also identified by blue, creating the word family: Kim and rim. Consonants g and h, identified by purple (segments 16e), are each to be paired with V-C blend, em, also identified by purple, creating the word family: gem and hem. As is clear now, the matching colors guide the student in the exercise of forming words and word families.

The present invention is not limited to the use of color indicia. Any other type of matching indicia may be employed. As used herein, "indicia" means any identifying or distinguishing attribute, mark, indication, or sign. Without limiting the scope of the term, indicia may take the form of a single color, multiple colors, a color-filled background, a color pattern, a font color, shades of gray, black and white pattern, a symbol or logo, geometric shape, any other type of pattern, a single character or characters, and the like. In the context of the present invention, "indicia" does not include the word fragments themselves or any part of them. However, if the font of the word fragments is colored or shaded in a distinguishing fashion, such an attribute is considered indicia for the purposes of the present invention. Color indicia are preferred for the present invention. As used herein, "color indicia" means any indicia using, in whole or in part, color as an identifying or distinguishing attribute. Color indicia includes, but is not limited to, a single color, multiple colors, a color-filled background, a color pattern, a font color, etc.

The terms "match," "matches," "matched," and "matching," as used herein, include the following meanings, without limitation: exactly alike; similar; resemble; harmonize; complement; correspond; etc. In addition, all other ordinary and accepted meanings are included for these terms.

The present invention is not limited to an embodiment where only one word-constructing member rotates or otherwise moves relative to another word-constructing member. Either or both members may be moveable or rotatable. For example, member 12 may be made to rotate about member 14, while member 14 remains fixed. In another example, both members 12 and 14 may be made to rotate, each relative to the other.

The term "member" is not limited to an actual physical object, but also includes within its meaning an object generated on an electronic display. The terms "rotate" and "move" also include within their meanings actions generated on an electronic display, such as computer-animated rotation or movement of a member on an electronic display.

Referring now to FIG. 3, there is shown an enlarged partial view of education apparatus 10, with a focus on the vowel-consent blend, ab, and the consonant, c. The V-C blend, ab, has been paired together with the consonant, c, both identified by matching yellow color indicia. The pairing of ab and c forms the word "cab," with the intended meaning—a car that carries passengers. After the student forms the word "cab," he or she should pronounce the word and consider its meaning. A further aspect of the present invention is to provide a means to self-verify or reassure the student as to the correctness of the word and its meaning. This is accomplished in the preferred embodiment by associating a word image with each of the consonants 20 on member 12. Each word image symbolizes a word to be formed using the consonant that is associated with the image. In FIG. 3, the consonant, c, is associated with a word image 26 representing a yellow cab (or taxicab). Once the student forms the word "cab" and pronounces it, and considers its meaning, he or she can then verify the word by viewing image 26 through an opening 27 in member 12. Member 12 contains twenty such openings, which are located within segments 16, respectively.

Figure 5:
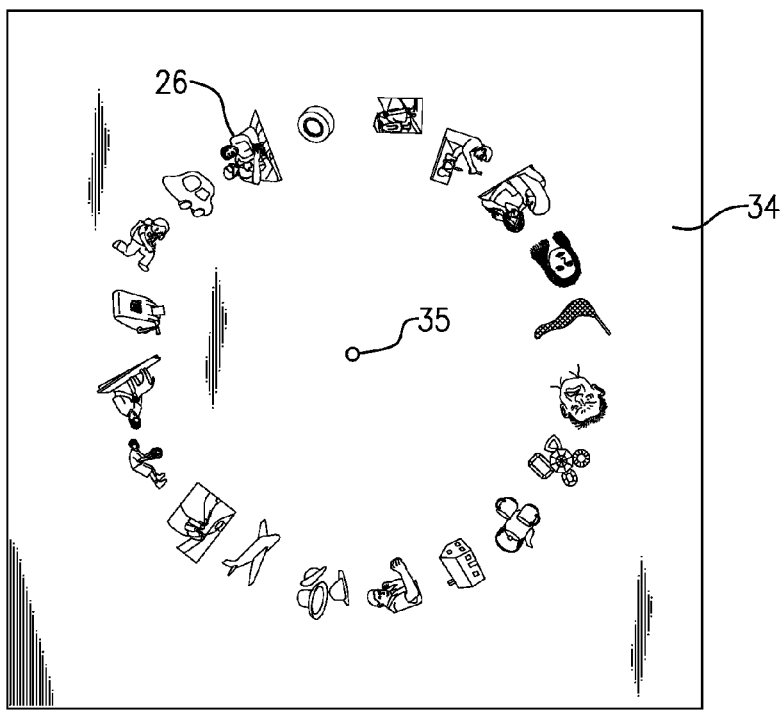
FIG. 5 is a plan view of an insert sheet containing a set of word images, the insert sheet being an internal component of the apparatus of FIG. 1.

The word images are normally hidden from view, behind door-like flaps 28 (FIG. 3). Each door-like flap 28 is located at one of the openings 27 and is configured to close the opening. Each flap 28 is hinged by a simple fold hinge 30 along a spine 31. Each flap 28 contains a cutout recess 32. Flaps 28 are arranged in a back-to-back manner, as understood from FIG. 3 and by the location of recesses 32. Each pair of back-to-back flaps 28 shares one of the spines 31. An insert sheet 34, made of paper or paperboard, lies underneath members 12 and 14. Each spine 31 is affixed (e.g., by adhesive) to sheet 34 for support of the spine and the associated hinges 30. Further construction details are provided below. Recess 32 allows one to manually open flap 28 by placing a finger in the recess and pulling. Word images 26 are printed on or otherwise applied to sheet 34 (FIG. 5). FIG. 3 shows one word image 26 printed directly on a front surface of sheet 34. Alternatively, the image may be printed on a sticker, which is then applied to sheet 34. As now understood, flaps 28 provide a means for selectively revealing images 26, so that an image can be viewed in connection with a formed word.

Figure 4:
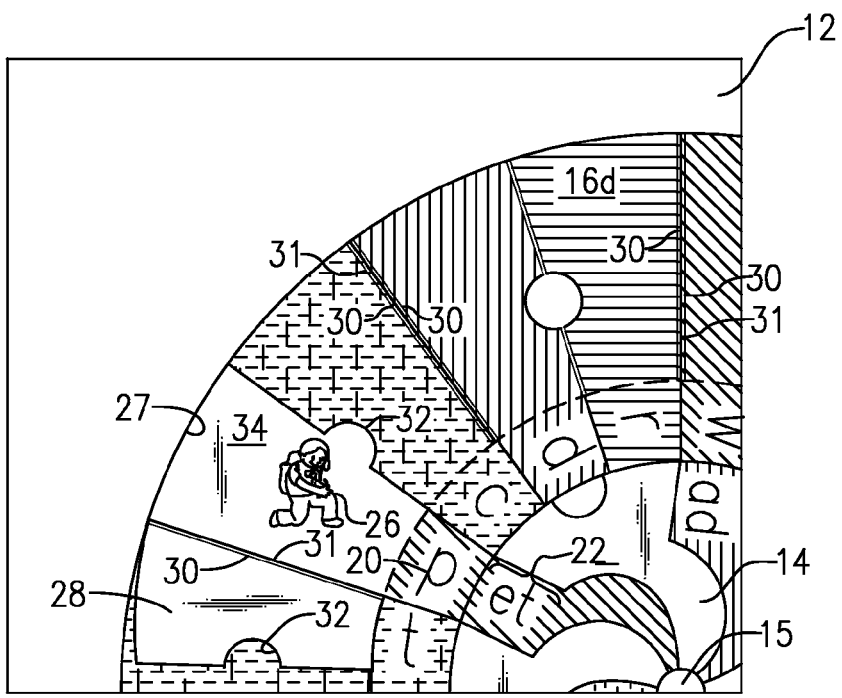
FIG. 4 is an enlarged partial view of the apparatus of FIG. 1, with a focus on the consonant "p" on a green background.

FIG. 4 shows an enlarged partial view of apparatus 10, which is similar to FIG. 3 except member 14 has been rotated to pair vowel-consent blend, et, with the consonant, p. Both word fragments are identified by matching green color indicia. The pairing of et and p forms the word "pet," with the intended meaning—an animal kept for amusement or companionship. After pronouncing the word and considering its meaning, the student should verify her work by opening the adjacent flap 28 to reveal the associated word image 26. In this case, the word image represents a child holding a puppy. The image is printed on sheet 34, and the image is viewed through opening 27.

FIG. 5 shows insert sheet 34 separated from the assembly of apparatus 10 for purposes of illustration. Twenty word images 26 are printed in a circular pattern around a center hole 35 contained in sheet 34. Center hole 35 is centered at center axis A when properly in place in the completed assembly of apparatus 10. Images 26 are arranged such that when sheet 34 is assembled in place under member 12, each image is in registration with one of the openings 27 of member 12. The word images on sheet 34 correspond to the words to be formed using members 12 and 14. The images are, in clockwise order: a yellow CAB; a DAD sitting with his family; a tire RIM; children walking in WET weather; a person working in a LAB; a SAD person being consoled; a girl named KIM; a butterfly NET; a person with a MAD facial expression; precious GEMs; a tea SET; a dwelling or PAD; a boxer throwing a JAB; hat styles that are a passing FAD; a JET airplane; hands sewing a HEM; a young LAD bouncing a basketball; a VET treating a dog; an adding-machine adding up a TAB; and, a girl holding her PET puppy.

FIG. 6 is an exploded view of phonics education apparatus 10, illustrating the assembly of apparatus 10. A wrapper 36 is pre-cut from a flat sheet of material, such as paperboard, and includes word-constructing member 12 and four end-flaps 38a to 38d. Wrapper 36 contains a circular through-hole 37 located at the center of member 12. Preferably, member 12 is also pre-cut along lines 40 (at each segment) to create the door-like flaps 28, openings 27, and recesses 32. Alternatively, lines 40 may be perforated or scored (rather than cut)

so that flaps 28 remain in place until apparatus 10 is first used. The perforations or scoring would allow flaps 28 to be opened without tearing member 12. Adhesive is applied to the back of member 12 (not shown) at the locations where spines 31 are to be established, and the adhesive is aligned with spines 31 (see also FIG. 3).

Figure 7:
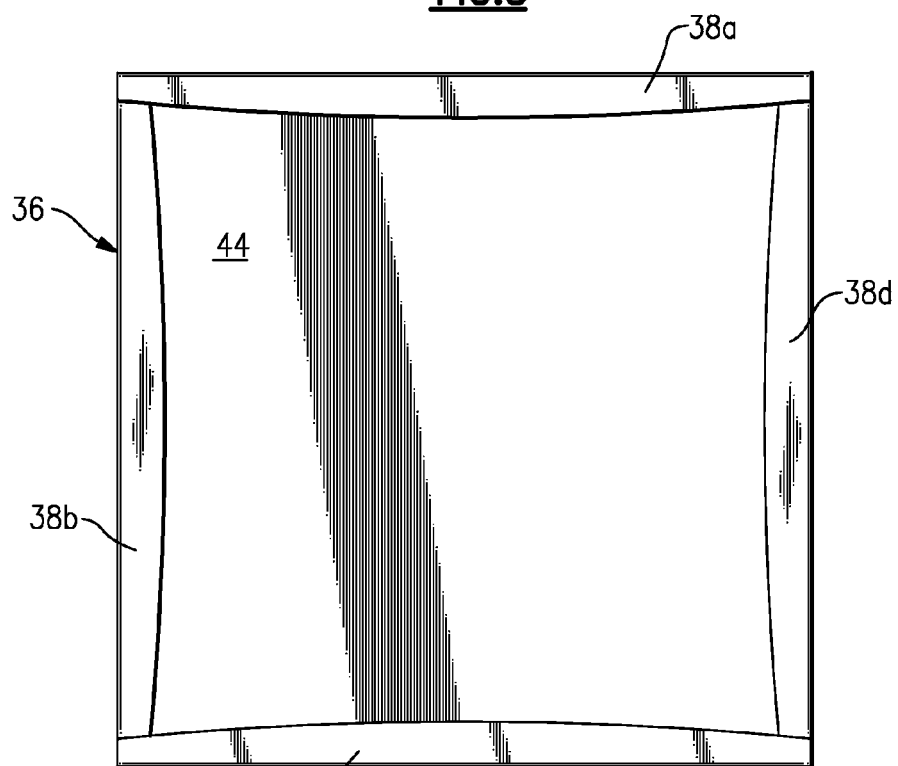
FIG. 7 is a bottom plan view of the apparatus of FIG. 1.

Initially, in the assembly process, rotating member 14 is pivotally fastened to insert sheet 34 by rivet 15 (see also FIG. 1) and a washer 42. The stem of rivet 15 is inserted through a center hole 13 in member 14 and then through center hole 35 in sheet 34. Washer 42 is then placed on the stem of rivet 15, behind sheet 34 where the stem projects out. The end of the stem is then peened or otherwise deformed to create a head, which loosely clamps washer 42 and member 14 to sheet 34. Instead of a rivet, a conventional snap-on fastener may be used. In a next step of the assembly process, the riveted sub-assembly of member 14 and sheet 34 is inserted into wrapper 36 from the rear, so that member 14 registers with and fits in center through-hole 37 and is free to rotate within through-hole 37. The adhesive on the back of member 12 adheres to the front of insert sheet 34 to establish a firm support for spines 31 (FIG. 3). Adhesive is also applied between the back of member 12 and the front of sheet 34 at locations coinciding with the circumferential path of consonants 20 and the areas outside the perimeter of segments 16. In a further step in the assembly process, a backing board 44 is inserted into wrapper 36 from the rear, sandwiching the riveted sub-assembly against the back surface of member 12. Board 44 acts as a stiffening sheet and may be made of paper-board, cardboard or plastic. In a final assembly step, end-flaps 38a-38d are folded down and over the edges of board 44 and are affixed to the back side of board 44 with an adhesive (see FIG. 7). The secured end-flaps firmly hold the whole assembly together. A rear view of the final assembly is shown in FIG. 7. At the conclusion of the assembly steps you have a freestanding education apparatus with fixed and rotatable word-constructing members.

Figure 8:
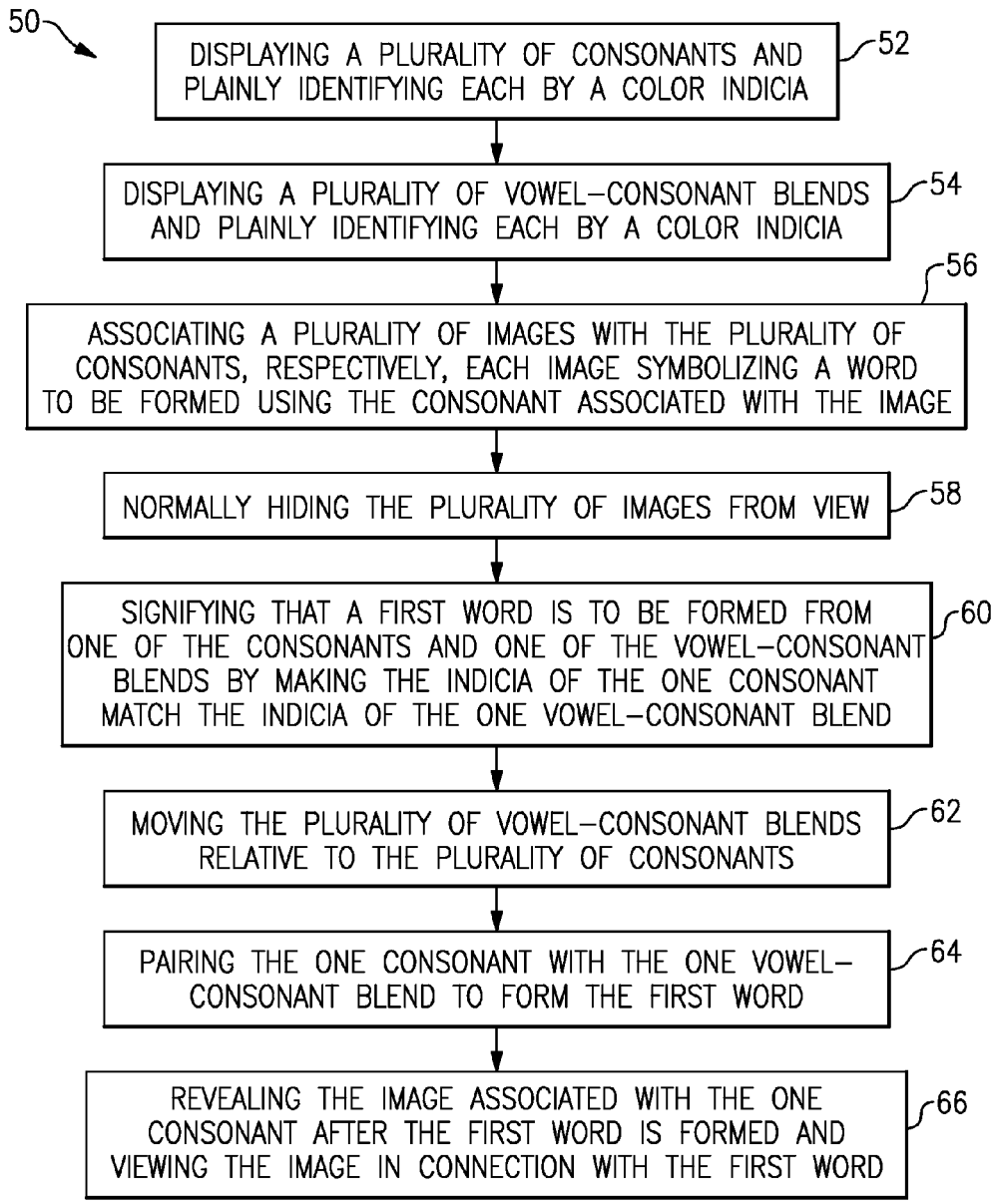
FIG. 8 is a flow diagram illustrating the steps of a preferred method of the present invention.

Referring now to FIG. 8, a flow diagram illustrates a reading phonics education method 50, performed in accordance with one embodiment of the present invention. A step 52 includes displaying a plurality of consonants and plainly identifying each consonant by a color indicia. A step 54 includes displaying a plurality of V-C blends and plainly identifying each V-C blend by a color indicia. A step 56 includes associating a plurality of images with the plurality of consonants, respectively, where each image symbolizes a word to be formed using the consonant associate with the image. A step 58 includes normally hiding the plurality of images from view. A step 60 includes signifying that a first word is to be formed from one of the consonants and one of the V-C blends by making the indicia of the one consonant match the indicia of the one V-C blend. A step 62 includes moving the plurality of V-C blends relative to the plurality of consonants. A step 64 includes pairing the one consonant with the one V-C blend to form the first word. And, finally, a step 66 includes revealing the image associated with the one consonant after the first word is formed and viewing the image in connection with the first word.

The operation of apparatus 10 will now be described with reference to FIG. 1. Word-constructing member 14 is manually rotated (clockwise and/or counterclockwise) relative to word-constructing member 12 by engaging one of the recesses 24 with a finger and turning member 14. Member 14 is stopped when a V-C blend 22 on member 14 is paired with a consonant 20 on member 12, and the blend 22 and consonant 20 are from segments with matching colors. The paired V-C blend and consonant form a word, which should be read and pronounced by the student. The word and its meaning are then verified by opening the flap 28 associated with the consonant, to reveal the image 26 that symbolizes the word. The flap 28 is opened by engaging its recess 32 with a finger and pulling the flap open (see also FIG. 3). This operation is repeated to form other words from the same word family (same color) or a different word family (different color).

Apparatus 10 can be used in conjunction with a reading book called a "high-frequency reader." The reader reinforces the learning the words and word families introduced by apparatus 10, by presenting the words in simple sentences and repeating the words in progressively extended sentences. An example of this is shown in FIG. 9. In FIG. 9, a page 70 from the reader contains a series of sentences that reinforce the learning of the word "cab," along with other words in the "ab" family. The sentences cumulatively present the words of the "ab" family, one sentence and one word at a time. When the student sees the word "cab" in a sentence, he will pronounce the word with confidence and clarity, because he has been assured by apparatus 10 that the letters "c-a-b" form the word "cab" and have the blended sounds of "c" and "ab." He is also confident (from the taxicab image of apparatus 10) about the meaning of the word. This same principle holds true for the other words in the "ab" (yellow) family. By presenting a family of rhyming words, the reader and apparatus 10 encourage the student to pronounce all of the words in the family. Rhyming words are fun too.

In the reader, each word of a word family formed by apparatus 10 is highlighted in the series of sentences in a different colored font from the rest of the sentence. For example, the words of the word family are printed in red font and the rest of the sentence is printed in black font. Also, words not formed by apparatus 10, but belonging to the same word family, appear in the sentences (in italics) to further challenge the student. For instance, on reader page 70 (FIG. 9), the additional words "gab," "nab" and "dab" are introduced.

The reader presents the material in the context of an imaginary trip to an imaginary town. Each street in the town is dedicated to a particular word family. The student progresses through the reader (i.e., town) by driving from one street to another. For example, the student may start at "on" street, turns right onto "in" street, goes down to "aw" street . . . crosses over to "ab" street (FIG. 9), etc. The reader is organized such that a chapter contains all the word families presented by a single version of apparatus 10. The reader contains multiple chapters, which correspond to multiple versions of apparatus 10. Each chapter begins with a colored drawing of one version of apparatus 10. For example, apparatus 10 of FIG. 1 is depicted at the beginning of the second chapter of the reader, and the second chapter contains the street names (i.e., the V-C blends in FIG. 1): ab, em, ad, et, and im. In FIG. 9, page 70 concerns the "ab" street name from the second chapter. The second chapter presents in sentences all twenty words formed by apparatus 10 of FIG. 1, again, organized according to word families. The street names are depicted on street signs, each of which is colored the same color as the corresponding (V-C blend) segment 18 on apparatus 10. For example, in FIG. 9, street "ab" is depicted on a yellow street sign, and this corresponds to the yellow segment 18a containing "ab" on apparatus 10 (FIG. 1). The reader may be in the form of a book, booklet, flash cards, or other form of publication, including but not limited to electronic books and publications and software programs. In FIG. 9, page 70 may be a flash card, rather than a page from a book.

As indicated, multiple versions of apparatus 10 may be created to introduce additional consonants and V-C blends and their resulting word families. Eight examples of different versions of apparatus 10 (also chapters in the reader) are given in the following Table 1:

TABLE 1

| Color | Consonant | V-C Blend | Word |
|---|---|---|---|
| Version 1 | | | |
| Yellow | s, t, w | on | son, ton, won |
| Pink | b, g, n, s | un | bun, gun, nun, sun |
| Green | j, l, p, r, s | aw | jaw, law, paw, raw, saw |
| Blue | h, j, r, t, y | am | ham, jam, ram, tam, yam |
| Purple | b, f, p | in | bin, fin, pin |
| Version 3 | | | |
| Yellow | b, l, p | eg | beg, leg, peg |
| Pink | b, G | us | bus, Gus |
| Green | b, k, p, s, z | it | bit, kit, pit, sit, zit |
| Blue | b, c, f, S | ur | bur, cur, fur, Sur |
| Purple | b, c, f, m, p, v | an | ban, can, fan, man, pan, van |
| Version 4 | | | |
| Yellow | f, t, w | ax | fax, tax, wax |
| Pink | b, m, r | ed | bed, med, red |
| Green | d, h, J, m, p, t | en | den, hen, Jen, men, pen, ten |
| Blue | c, p, r, s | od | cod, pod, rod, sod |
| Purple | b, k, l, S | id | bid, kid, lid, Sid |
| Version 5 | | | |
| Yellow | b, f, p | ox | box, fox, pox |
| Pink | c, h, m, t | op | cop, hop, mop, top |
| Green | d, h, l, r, z | ip | dip, hip, lip, rip, zip |
| Blue | b, d, f, h, j, l | og | bog, dog, fog, hog, jog, log |
| Purple | b, c | ow | bow, cow |
| Version 6 | | | |
| Yellow | b, r | ib | bib, rib |
| Pink | c, f, g, h | ob | cob, fob, gob, hob |
| Green | b, n, s, t | ag | bag, nag, sag, tag |
| Blue | b, c, f, h, m, r | at | bat, cat, fat, hat, mat, rat |
| Purple | b, F, h, p | ay | bay, Fay, hay, pay |
| Version 7 | | | |
| Yellow | b, g, r | um | bum, gum, rum |
| Pink | c, g, h, n | ut | cut, gut, hut, nut |
| Green | c, g, l, m, n, t | ap | cap, gap, lap, map, nap, tap |
| Blue | c, d, h, p, t | ot | cot, dot, hot, pot, tot |
| Purple | m, T | om | mom, Tom |
| Version 8 | | | |
| Yellow | b, s, t | oy | boy, soy, toy |
| Pink | c, j, t | ar | car, jar, tar |
| Green | b, d, g, j, p, w | ig | big, dig, gig, jig, pig, wig |
| Blue | b, h, j, m, r | ug | bug, hug, jug, mug, rug |
| Purple | c, p, s | up | cup, pup, sup |
| Version 9 | | | |
| Yellow | D, J, w | eb | Deb, Jeb, web |
| Pink | b, c, m | ud | bud, cud, mud |
| Green | d, h, L, p, y | ew | dew, hew, Lew, pew, yew |
| Blue | g, S | as | gas, Sas |
| Purple | B, c, h, n, r, s, t | ub | Bub, cub, hub, nub, rub, sub, tub |

From the description above a number of advantages of some embodiments of the present invention become evident:

(a) It is phonics made easy. It is a fun way to reinforce phonics skills especially the substitution of consonants to form rhyming words. Children of primary and preschool age will get continual practice in identifying consonant sounds at the beginning of words as they turn the wheel around and around. The child will be able to recognize, spell and pronounce short vowels (a, e, i, o, u) in one-syllable words.

(b) The color-coded wheel and board schemes help children of primary and preschool age to identify different word families, decode words with an r-controlled vowel (ar), vowel digraph (ay) and vowel diphthongs (ow, ew, oy, aw).

(c) It is a kid-friendly and uncomplicated tool of a reasonable size, with easy to read letters, and the color-coded wheel makes matching colors to form twenty new words per board as simple as 1, 2, and 3. Children of primary and preschool age will be enthusiastic and have so much fun they won't know where playtime ends and learning begins.

To review, the preferred embodiment is a phonics education tool, comprising a stationary word-constructing member or wheel and a smaller rotating word-constructing wheel concentrically placed with the stationary member. The rotating wheel contains V-C blends and the stationary member contains consonants. The rotating wheel is rotated to pair together a V-C blend with a consonant to construct a one-syllable word. The student is guided in pairing a V-C blend with a consonant by use of color. Each V-C blend and consonant is situated on a segment having a particular color. The student is guided in constructing a word by matching the color on the stationary member with the color on the rotating wheel. The other aspect of the tool is that the student can verify the constructed word, and learn more about the word, by opening a flap on the stationary member to reveal an image representing the word. Thus, the preferred embodiment comprises the following essential elements: (1) constructing words with a word-constructing wheel rotated relative to a fixed word-constructing member or wheel; (2) guiding the construction of the words by using matching colors on the rotating wheel and fixed member; and (3) verifying the words, and providing information about the words, by revealing hidden images representing the words.

It is to be understood that the present invention can be implemented in many different ways. For example, rather than arranging members 12 and 14 in a concentric fashion, they can be arranged side-by-side and/or overlapping, with two or more word-constructing members being rotated. Such arrangements are disclosed in U.S. Pat. No. 6,869,286 to Furry and U.S. Pat. No. 4,643,680 to Hill. Alternatively, members 12 and 14 can be in the form of rotating, adjoining cylindrical elements, like the configuration disclosed in U.S. Pat. No. 2,411,717 to Fay et al. Further, the present invention may employ more than two word-constructing members to form a complete word. Such configurations are disclosed in the above-cited patents to Furry and Hill and in U.S. Pat. No. 259,920 to Reiff. The present invention may also be implemented in software, with the word-constructing members being generated and animated on an electronic display. The latter embodiment may operate on any processor-based platform such as, e.g., a desktop or laptop computer, electronic pad, personal digital assistant, or mobile phone.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A phonics education apparatus, comprising:
a first word-constructing member having a first plurality of word fragments displayed thereon, each of the first plurality of word fragments being plainly identified by an indicia;
a second word-constructing member, positioned adjacent said first word-constructing member, having a second plurality of word fragments displayed thereon, each of the second plurality of word fragments being plainly identified by an indicia, the indicia of each of the second plurality of word fragments being different from each other and substantially matching the indicia of at least one of the first plurality of word fragments, the substantially matching indicia signifying that a word construct is to be formed from the word fragments identified by the substantially matching indicia, either or both of said first and said second members being movable, one relative to the other, enabling any word fragment of the first plurality of fragments to be paired together with any word fragment of the second plurality of fragments, whereby the formation of word constructs by the pairing of word fragments from the first and the second pluralities of fragments is guided by the indicia identifying the word fragments;

a plurality of images associated with the first plurality of word fragments, respectively, each image symbolizing a word construct to be formed using the word fragment associated with the image, said plurality of images being normally hidden from view; and means for selectively revealing each of said plurality of images, such that when a word construct is formed the image symbolizing the word construct can be revealed and viewed in connection with the formed word construct.

2. The apparatus of claim 1, wherein the first plurality of word fragments includes a plurality of consonant-based word fragments and the second plurality of word fragments includes a vowel-based word fragment, and wherein the indicia of the vowel-based fragment substantially matches the indicia of each of the plurality of consonant-based fragments, to guide the formation of a family of words from the plurality of consonant-based fragments and the vowel-based fragment.

3. The apparatus of claim 2, wherein the vowel-based fragment represents a vowel sound.

4. The apparatus of claim 3, wherein each consonant-based fragment represents a consonant sound.

5. The apparatus of claim 1, wherein the indicia identifying each of the first and the second pluralities of word fragments is a color indicia.

6. The apparatus of claim 5, wherein the color indicia of each word fragment is a colored background on which the word fragment is located.

7. The apparatus of claim 1, wherein the first plurality of word fragments includes a plurality of consonant-based word fragments and the second plurality of word fragments includes a vowel-based word fragment, and wherein the indicia of each of the plurality of consonant-based fragments is a first color indicia and the indicia of the vowel-based fragment is a color indicia that substantially matches the first color indicia, whereby the first color indicia and the color indicia that substantially matches the first color indicia guide the formation of a family of words from the plurality of consonant-based fragments and the vowel-based fragment.

8. The apparatus of claim 1, wherein the first word-constructing member includes a first sheet of material having a front surface, the first plurality of word fragments being displayed on the front surface and disposed circumferentially about a central axis at a first radius, and wherein the second word-constructing member includes a second sheet of material having a front surface and being positioned in concentric relationship to the first sheet, the second plurality of word fragments being displayed on the front surface of the second sheet and being disposed circumferentially about the central axis at a second radius, the second radius being smaller than the first radius such that the second plurality of word fragments is radially spaced from and adjacent to the first plurality of word fragments, respectively, the second sheet being pivotally mounted at about the central axis for rotational movement relative to the first sheet, such that one of the second plurality of word fragments can be selectively paired with one of the first plurality of word fragments.

9. A phonics education apparatus, comprising:

a first area displaying a first plurality of word fragments, the first plurality of word fragments being disposed along a circumferential path about a central axis at a first radius and each being plainly identified by a first color indicia;

a second area, positioned in concentric relationship to said first area, displaying a first complementary word fragment, the first complementary word fragment being disposed about the central axis at a second radius different from the first radius such that the first complementary word fragment is radially spaced from and adjacent to the circumferential path of the first plurality of word fragments, the first complementary word fragment being plainly identified by a color indicia that substantially matches the first color indicia, either or both of said first and said second areas being rotatable about the central axis, enabling the first complementary word fragment to be paired with any one of the first plurality of word fragments to form a word, whereby the first color indicia and the color indicia that substantially matches the first color indicia guide the formation of a family of words from the first plurality of word fragments and the first complementary word fragment;

a plurality of images associated with the first plurality of word fragments, respectively, each image symbolizing a word to be formed using the word fragment associated with the image, said plurality of images being normally hidden from view; and means for selectively revealing each of said plurality of images, such that when a word is formed by pairing one of the first plurality of word fragments with the first complementary word fragment, the image symbolizing the word can be revealed and viewed in connection with the word.

10. The apparatus of claim 9, wherein said first area further displays a second plurality of word fragments, the second plurality of fragments being disposed along the circumferential path about the central axis at the first radius and being plainly identified by a second color indicia, and wherein said second area further displays a second complementary word fragment, the second complementary fragment being disposed about the central axis at about the second radius, such that the second complementary fragment is radially spaced from and adjacent to the circumferential path, the second complementary fragment being plainly identified by a color indicia that substantially matches the second color indicia, the rotation of either or both of said first and said second areas enabling the second complementary fragment to be paired with any one of the second plurality of word fragments to form a word, whereby the second color indicia and the color indicia that substantially matches the second color indicia guide the formation of a second family of words from the second plurality of word fragments and the second complementary fragment.

11. The apparatus of claim 9, wherein the word fragments of the first plurality of word fragments are consonant-based word fragments, and wherein the first complementary word fragment is a vowel-based word fragment.

12. The apparatus of claim 9, wherein said first area includes a plurality of circumferentially disposed segments, the first plurality of word fragments being situated in the plurality of segments, respectively, and wherein the first color indicia is a single color filling each of the plurality of segments, whereby each segment represents a colored background for the word fragment situated therein.

13. The apparatus of claim 12, wherein said second area includes a segment, the first complementary word fragment being situated in the segment of said second area, and wherein the color indicia of the first complementary fragment is a single color filling the segment of the second area, whereby the segment of the second area represents a colored background for the first complementary fragment, the color of the segment of the second area being substantially the same as the color of each segment of the first area.

14. A phonics education method, comprising the steps of:
(a) viewing a first plurality of word fragments including a first word fragment plainly identified by an indicia;
(b) viewing a second plurality of word fragments displayed adjacent to the first plurality of word fragments, the second plurality including a first word fragment plainly identified by an indicia, the indicia of the first word fragment of the first plurality substantially matching the indicia of the first word fragment of the second plurality, the substantially matching indicia signifying that a first word construct may be formed by pairing together the first word fragments;
(c) pairing the first word fragment of the first plurality with the first word fragment of the second plurality to form the first word construct, said pairing step including moving either or both of the first and the second pluralities of word fragments, one relative to the other, and matching the indicia of the first word fragment of the first plurality with the indicia of the first word fragment of the second plurality;
(d) normally hiding a first image associated with the first word fragment of the first plurality, the first image symbolizing the first word construct;
(e) revealing the first image after the first word construct is formed in step (c); and
(f) viewing the first image in connection with the first word construct.

15. The method of claim 14, wherein the first plurality of word fragments includes a second word fragment plainly identified by an indicia, the indicia of the second word fragment substantially matching the indicia of the first word fragment of the second plurality, to signify that a second word construct may be formed by pairing the second word fragment of the first plurality with the first word fragment of the second plurality, said method further comprising the step of:
(g) pairing the second word fragment of the first plurality with the first word fragment of the second plurality to form the second word construct, said pairing step including moving either or both of the first and the second pluralities of word fragments, one relative to the other, and matching the indicia of the second word fragment of the first plurality with the indicia of the first word fragment of the second plurality.

16. The method of claim 14, wherein the first plurality of word fragments includes a second word fragment and the second plurality of word fragments includes a second word fragment, the second word fragments each being plainly identified by an indicia, the indicia of the second word fragments substantially matching each other to signify that a second word construct may be formed by pairing together the second word fragments, said method further comprising the step of:
(g) pairing the second word fragment of the first plurality with the second word fragment of the second plurality to form the second word construct, said pairing step including moving either or both of the first and the second pluralities of word fragments, one relative to the other, and matching the indicia of the second word fragment of the first plurality with the indicia of the second word fragment of the second plurality.

17. The method of claim 14, wherein each word fragment of the first plurality of word fragments is plainly identified by a first indicia, the first indicia substantially matching the indicia of the first word fragment of the second plurality of word fragments, to signify that a family of words may be formed between each word fragment of the first plurality and the first word fragment of the second plurality, said method further comprising the step of:
(g) pairing each of the first plurality of word fragments with the first word fragment of the second plurality to form the family of words, said pairing step including moving either or both of the first and the second pluralities of word fragments, one relative to the other, and matching the first indicia of each word fragment of the first plurality with the indicia of the first word fragment of the second plurality.

18. The method of claim 17, further comprising the steps of:
(h) opening a reader that includes a plurality of sentences containing the family of words, respectively, the sentences cumulatively presenting the family of words, one sentence and one word at a time; and
(i) reading the plurality of sentences from the reader to reinforce the learning of the family of words.

19. The method of claim 14, wherein the first word construct is a complete word, said method further comprising the steps of:
(g) opening a reader that includes a sentence containing the complete word; and
(h) reading the sentence from the reader to reinforce the learning of the complete word.

20. The method of claim 19, wherein the reader includes a plurality of progressively extended sentences, each sentence containing the complete word, and wherein step (h) includes reading the plurality of sentences from the reader.

21. A method of learning a family of words, comprising the steps of:
(a) viewing a first plurality of concurrently displayed word fragments, the first plurality including a group of word fragments and a plurality of other word fragments, the group of word fragments being associated with a family of words and each word fragment of the group being plainly identified by a first indicia, the word fragments of the group being disposed among the plurality of other word fragments;
(b) viewing a second plurality of word fragments concurrently displayed with and positioned adjacent to the first plurality of word fragments, the second plurality including a complementary word fragment associated with the family of words and plainly identified by a second indicia, the second indicia substantially matching the first indicia to signify that the family of words may be formed by pairing each word fragment of the group with the complementary word fragment;

(c) pairing one of the group of word fragments with the complementary word fragment to form a word from the family of words, said pairing step including moving either or both of the first and the second pluralities of word fragments, one relative to the other, and matching the first indicia of the one of the group with the second indicia of the complementary word fragment; and (d) repeating step (c) for each word fragment of the group of word fragments, whereby the learning of a family of words is aided by the repetition of the steps of moving either or both of the first and the second pluralities of word fragments, one relative to the other, and matching the first indicia of each of the group of word fragments with the second indicia of the complementary word fragment.

22. The method of claim 21, wherein the first indicia of the group of word fragments is a color indicia.

23. The method of claim 21, wherein the first indicia of the group of word fragments is a color and the second indicia of the complementary word fragment is a color.

24. The method of claim 23, wherein the color associated with the group of word fragments is the same as the color associated with the complementary word fragment.

25. The method of claim 21, wherein:

the word fragments of the first plurality of word fragments are displayed circumferentially about a central axis at a first radius;

the word fragments of the second plurality of word fragments are displayed circumferentially about the central axis at a second radius, the second plurality being arranged in concentric relationship with the first plurality, such that the second plurality is radially spaced from and adjacent to the first plurality; and step (c) includes rotating either or both of the first and the second pluralities of word fragments about the central axis.

26. The method of claim 25, wherein each word fragment of the group of word fragments is a consonant-based word fragment, and wherein the complementary word fragment is a vowel-based word fragment.

27. The method of claim 21, further comprising the steps of:

(e) normally hiding a plurality of images associated with the group of word fragments, respectively, each image of the plurality of images symbolizing a word from the family of words;

(f) revealing one image of the plurality of images after performing step (c), the one image symbolizing the word formed in step (c); and (g) repeating step (f) for each other word formed by repeating step (c).

28. A phonics education method, comprising the steps of:

(a) viewing a first plurality of concurrently displayed word fragments;

(b) viewing a second plurality of word fragments concurrently displayed with and positioned adjacent to the first plurality of word fragments;

(c) pairing one of the word fragments of the first plurality with one of the word fragments of the second plurality to form a first word construct, said pairing step including moving either or both of the first and the second pluralities of word fragments, one relative to the other, and matching the one word fragment of the first plurality with the one word fragment of the second plurality;

(d) normally hiding a first image associated with the one word fragment of the first plurality, the first image symbolizing the first word construct;

(e) revealing the first image after the first word construct is formed in step (c); and (f) viewing the first image in connection with the first word construct.

29. The method of claim 28, wherein:

the word fragments of the first plurality of word fragments are displayed circumferentially about a central axis at a first radius;

the word fragments of the second plurality of word fragments are displayed circumferentially about the central axis at a second radius, the second plurality being arranged in concentric relationship with the first plurality, such that the second plurality is radially spaced from and adjacent to the first plurality; and step (c) includes rotating either or both of the first and the second pluralities of word fragments about the central axis.

* * * * *